United States Patent [19]

Moyer et al.

[11] 3,715,092
[45] Feb. 6, 1973

[54] DELAYED SIMULTANEOUS RELEASE MECHANISM

[75] Inventors: Xopher W. Moyer, New Carrollton; John B. Webb, Annapolis, both of Md.

[73] Assignee: The United States of America as represented by the Administrator of the National Aeronautics and Space Administration

[22] Filed: May 28, 1970

[21] Appl. No.: 41,404

[52] U.S. Cl. ............................. 244/1 SS, 244/1 SA
[51] Int. Cl. .................................................. B64g 1/00
[58] Field of Search ......... 244/1 SS, 1 A, 1 D, 138 A, 244/3.23; 343/705, 915, DIG. 2

[56] References Cited

UNITED STATES PATENTS

| 3,128,845 | 4/1964 | Parker | 244/1 SS X |
|---|---|---|---|
| 3,229,930 | 1/1966 | Fedor et al. | 244/1 SS |
| 3,423,755 | 1/1969 | Lassen et al. | 244/1 SS X |
| 3,540,676 | 11/1970 | Madey et al. | 244/1 SS |

Primary Examiner—Milton Buchler
Assistant Examiner—Barry L. Kelmachter
Attorney—R. F. Kempf, E. Levy and John R. Manning

[57] ABSTRACT

The disclosed appendage release mechanism is particularly adapted for use with spacecraft operating with despin mechanisms and releasable appendages. It includes a flexible loop and a plurality of appendage releasing devices which are attached to the flexible loop. The appendage releasing devices are made up of piston-cams and ball latches which hold the appendages as long as the flexible loop is maintained in a taut condition but which release the appendages upon relaxation of the flexible loop. The flexible loop remains taut as long as the despin weights, which weights are attached to the flexible loop by cords, remain attached but relaxes when the despin weights are released.

10 Claims, 6 Drawing Figures

PATENTED FEB 6 1973

INVENTORS
XOPHER W. MOYER
JOHN B. WEBB

BY *Carl Levy*

ATTORNEYS

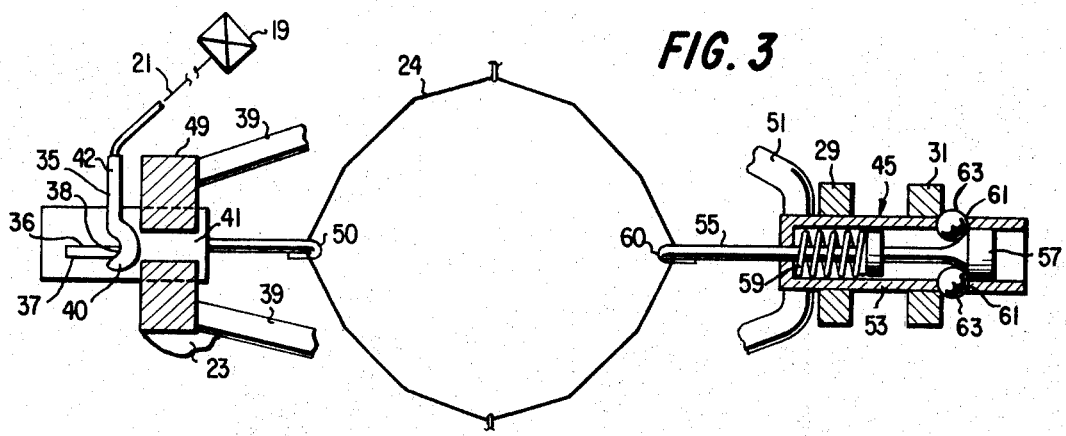
FIG. 3
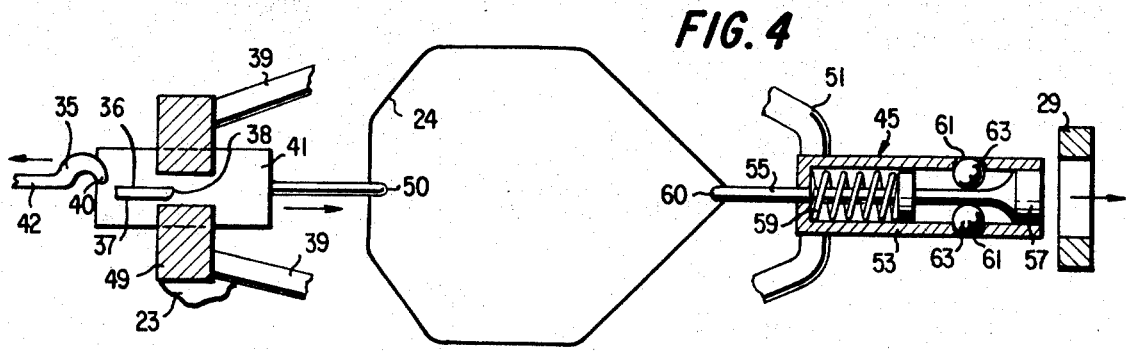
FIG. 4
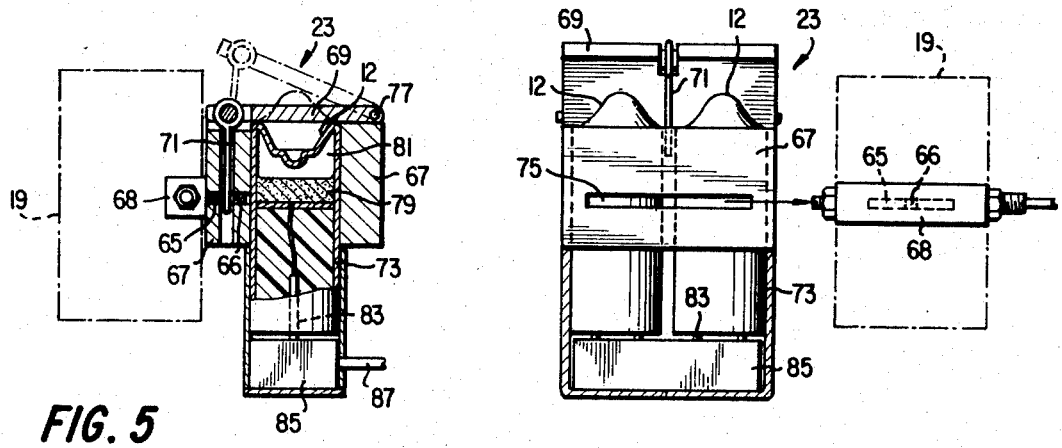
FIG. 5
FIG. 6
INVENTORS
XOPHER W. MOYER
JOHN B. WEBB
BY Earl Levy
ATTORNEYS

DELAYED SIMULTANEOUS RELEASE MECHANISM

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates generally to spacecrafts and more particularly to apparatus designed to release and extend foldable appendages from a spacecraft once it has been propelled and has reached a predetermined altitude in space.

A launched experimental spacecraft often must perform two mechanical functions prior to becoming operational:

1. it must despin (slow down the spinning motion it has acquired during launch); and,
2. it must unfold its various appendages.

It is desirable that these two functions not interfere with one another.

The despin mechanism of many spacecraft comprises block weights attached to the ends of cords which are, in turn, attached to the spacecraft. Before the despin function takes place the weights are engaged to the side of the spacecraft, and the cords are wound around the spacecraft. To start the despin function the weights are disengaged from the spacecraft by the operation of squibs, and the cords unwind until they extend substantially perpendicularly outward from the spacecraft. The outwardly extending weights act to slow the spinning of the spacecraft in accordance with the principle of conservation of angular momentum. Once the weights and their attached cords are substantially perpendicular to the spacecraft's side, the cords are released and separate from the spacecraft and they, and the despin weights, drift away from the spacecraft.

Foldable appendages, such as antennas, solar cell arrays and booms, are folded against the spacecraft's side during launch and are unfolded once the spacecraft is in orbit.

The prior art prevents cross-interference between the despin mechanism and the foldable appendages by separating them spatially, one from the other. That is, in prior art spacecraft, the despin mechanism is mounted on the upper part of the spacecraft while the foldable appendages are hingedly attached at a lower point on the spacecraft and are folded downwardly. The free outer ends of the appendages are attached to a propulsion rocket stage to support them during launch.

A main disadvantage with the prior art "spatial separation" approach is that it requires additional coordination between the spacecraft contractor, the propulsion rocket contractor, and the appendage contractor to assure that the appendages fit between the hinge attachment point on the spacecraft and the attachment point on the propulsion rocket. The requirement for additional coordination between contractors increases the man-hours required to assemble the overall rocket-spacecraft system.

Space engineers have known for some time that a propulsion rocket appendage attachment can be avoided by using double folding appendages which fold against the side of the spacecraft in the manner of a folding ruler. However, double folding appendages require more folding area on the side of the spacecraft than do downwardly single folding appendages, so much so that they overlap onto the area needed for the despin mechanism. As yet, no one has suggested a satisfactory mechanism for mechanically coordinating the operation of the despin mechanism with that of the foldable appendages when they occupy overlapping areas on the side of the spacecraft. It will be appreciated that such a system must operate in a sequence of steps which provide the necessary coordination between the despin function and the appendage release and unfolding function. In this regard, the required mechanisms must ensure that all appendages are released for unfolding simultaneously so that unbalanced eccentric loads do not develop.

It is therefore an object of this invention to provide a system which coordinates the operation of a despin mechanism with that of a double foldable appendage release mechanism when they are both mounted on overlapping areas on a spacecraft.

It is a further object of this invention to provide an appendage release mechanism which releases simultaneously all appendages.

SUMMARY OF THE INVENTION

In accordance with principles of this invention, an appendage release mechanism is triggered by the release of all of the despin weights attached to a spacecraft so that the "appendage unfolding function" is begun only after the "despin function" is completed. More specifically, both the despin weights and appendage release devices are attached to a flexible triggering loop. When all the despin weights are released from the triggering loop, the triggering loop becomes slack and all of the appendage release devices respond simultaneously to this slackening of the triggering loop by releasing the appendages so that they can unfold. The appendage release devices are unique piston-cam latches which are designed to respond to a slackening of the triggering loop.

BRIEF DESCRIPTION OF THE DRAWINGS

The foregoing and other objects, features and advantages of this invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating the principles of the invention in a clear manner.

FIG. 3 and 4 are partially cutaway schematic representations of the appendage release mechanism and the despin mechanism with portions removed;

FIG. 5 is a side cutaway view of the despin weight disengage mechanism before it is activated; and, FIG. 6 is a front partially cutaway view of the despin weight disengaging mechanism after it has been activated.

DESCRIPTION OF A PREFERRED EMBODIMENT

Figure 1:
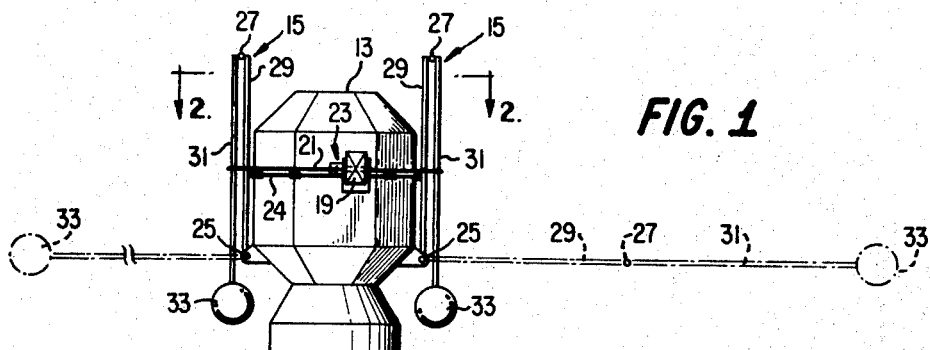
FIG. 1 is a side view of a spacecraft rocket system employing the appendage release mechanism of the invention.

Referring now to the drawings and more particularly to FIG. 1 wherein there is shown a despin mechanism and an appendage release mechanism mounted on a spacecraft 13. Also illustrated is the final stage 11 of a rocket booster on which the spacecraft 13 is mounted. Double foldable appendages 15 are attached to the spacecraft 13 by mounting hinges 25. The double foldable appendages 15 have intermediate hinges 27 which connect a primary boom 29 from a secondary boom 31 to allow the double foldable appendages 15 to be folded against the spacecraft 13 in the manner depicted in FIG. 1. Mounted on the tips of the appendages 15 are objects 33 which represent any type of working element, such as a magnetometer sensor, for example.

Figure 2:
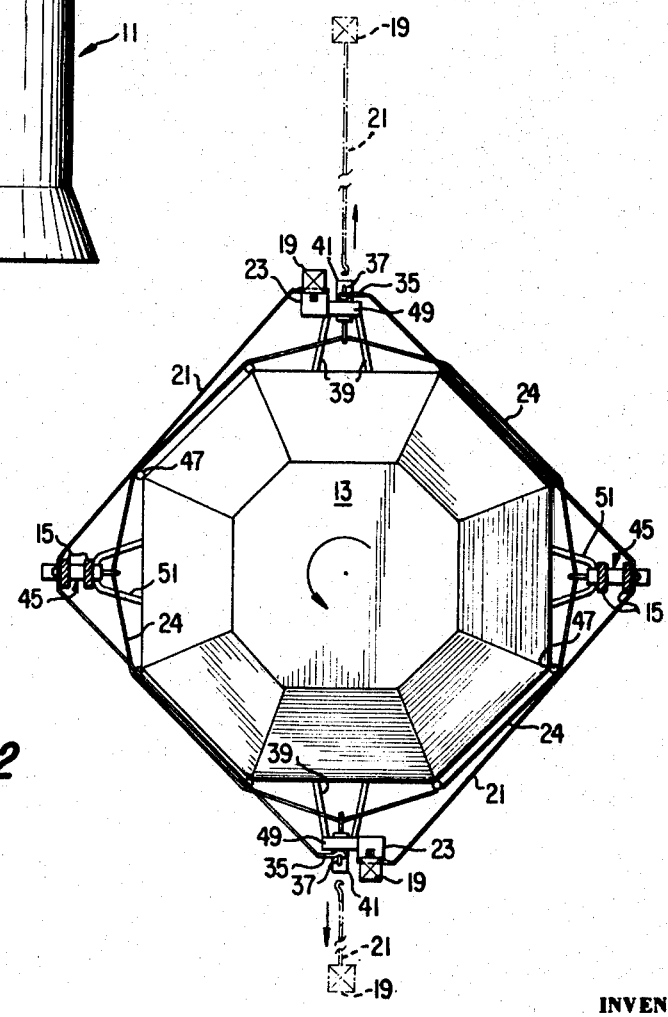
FIG. 2 is a top view of the system shown in FIG. 1.

The despin mechanism (shown more clearly in FIGS. 2, 3 and 4) is made up of: despin weights 19; despin cords 21; despin hooks 35; weight disengage mechanisms 23; and despin hook pins or projections 37. FIG. 2 shows the spacecraft system as it appears before the despin mechanism has been activated. The despin hooks 35 are engaged with the despin hook pins 37, as can be seen in detail in FIG. 3. The despin hook pins 37 each have a straight side 36 and an arcuate end 38. The despin hooks 35 each have a hooknose 40 and a straight shank 42. The end of each hooknose 40 is generally in line with a side of the straight shank 42. Each of the despin hooks 35 remains engaged with a despin hook pin 37 as long as a hooknose 40 is wrapped around the arcuate end 38. But once a despin hook 35 is rotated so that a side of its straight shank 42 and its hooknose 40 are lined up with the straight side 36 of a despin hook pin 37, the despin hook 35 is disengaged from the despin hook pin 37. Each of the despin hook pins 37 are actually part of and may be formed integral with an appendage release trigger 41 which will be described in detail below. As shown in FIG. 2, the despin cords 21 extend from the despin hooks 35 around the spacecraft and the foldable appendages 15 to the despin weights 19. The despin weights 19 are each attached to a weight disengage mechanism 23 which, in turn, is fixedly attached to a cylinder block 49 (described in detail below) which, in turn, is fixedly attached to the spacecraft by weight disengage supports 39.

The appendage release mechanism, as shown in FIG. 2, is made up of: a flexible triggering loop 24; appendage release triggers 41; and appendage release cylinder-piston assemblies 45. The flexible triggering loop 24 forms a loop around the spacecraft 13 and rides on pulleys 47, located at the corners of the spacecraft. The triggering loop 24 is attached to the appendage release triggers 41 and to the cylinder-piston assemblies 45 by trigger hook members 50 and latch hook members 60, respectively (see FIGS. 3 and 4). The appendage release triggers 41 are fixedly attached to the despin hook pins 37 and ride freely in cylinder blocks 49 which are supported from the spacecraft by weight disengage supports 39. Before the appendages are released, the release triggers 41 are prevented from passing through the cylinder blocks 49 by the despin hooks 35 which are engaged with the despin hook pins 37 and rest against the cylinder blocks 49. The appendage release cylinder-piston assemblies 45 are supported from the spacecraft by cylinder-piston supports 51.

A cylinder-piston assembly 45 is shown in schematic cutaway views in FIGS. 3 and 4, as being in line with an appendage release trigger 41. As shown in FIG. 2, the cylinder-piston assembly is actually displaced 90° in respect to the triggers 41; but for ease of explanation they are described as shown in FIGS. 3 and 4. Each cylinder-piston assembly 45 includes: a cylindrical housing 53; a piston shaft 55 having at one end a piston-cam 57, housed within said cylindrical housing 53, and at the other end a latch hook member 60; and, ball latches 63. The cylindrical housing 53 is fixedly supported by the cylinder-piston supports 51 attached to the spacecraft 13. The latch hook member 60 of piston shaft 55 connects the triggering loop 24 to the piston-cam 57 of piston shaft 55. The piston-cam 57 is allowed axial movement inside the cylindrical housing 53. A biasing spring 59 biases the piston-cam 57 in a direction away from the spacecraft. The cylindrical housing 53 has holes 61 cut in its side in which the ball latches 63 ride. The piston-cam 57 has a tapered shape such that, when it is pulled to the left by the action of the triggering loop 24 connected to the latch hook 60, it forces the ball latches 63 outwardly against the side walls of the holes 61, which side walls retain ball latches 63 in place, as shown in FIG. 3; and, when it is pulled to the right, it allows the ball latches to recede back into the cylindrical housing 53, as shown in FIG. 4. The ball latches 63 are prevented from passing completely through the holes 61 by the small diameter of the holes 61 relative to the diameter of the ball latches 63.

FIGS. 5 and 6 show in detail a weight disengage mechanism 23. Each weight disengage mechanism is made up of: a disengage tongue 65; a disengage housing 67; a top plate 69; a disengage pin 71; a weight attachment 68; and a squib assembly 73. The disengage tongue 65 is attached to the despin weight 19 by the weight attachment 68. The disengage housing 67 defines a disengage slot 75 (see FIG. 6) into which the disengage tongue 65 is inserted. The top plate 69 is hingedly attached to the disengage housing 67 by a disengage hinge 77. The disengage pin 71 is hingedly attached to the top plate 69 and is inserted into a disengage hole 66 in the disengage tongue 65; thus, the disengage pin 71 holds the despin weight 19 against the spacecraft by holding the disengage tongue 65 in a fixed position.

Each squib assembly 73, as shown in FIG. 6, includes two squibs, each being a self-contained unit and each comprising: an explosive 79; an expansion chamber 81; male plugs 83 (see FIG. 5). The male plug 83 can either be directly soldered to a female connector 85 or can have a rigid terminal which can be readily plugged into the female connector 85 which, in turn, is energized by a signal on initiation lines 87 which can come from the spacecraft or from a ground station (not shown).

Turning now to the operation of the despin mechanism and the appendage release system: when the spacecraft 13 is launched, the appendages 15 are still folded against the spacecraft and the despin cords 21 are wrapped around the spacecraft 13 (as shown in FIG. 1). The "despin-appendage unfolding operation" is commenced when the despin weights 19 are disengaged from the spacecraft. The operation, described with respect to one weight, is as follows: An electric signal is delivered along the initiation line 87 (shown in FIG. 5), through the female connector 85 and the male plugs 83, to the explosive 79 which expands rapidly in the expansion chamber 81. The outside contour 89 of the expansion chamber 81 is increased rapidly in size, causing an upward surge of pressure to be exerted on the top plate 69. This upward pressure, in turn, causes the top plate 69 to rotate upwardly about the disengage hinge 77. While rotating, the top plate 69 carries the disengage pin 71 with it, thus pulling the disengage pin 71 away from the disengage slot 75 and out of the disengage hole 66 in the disengage tongue 65. The disengage tongue 65, along with its attached despin weight, pulls out of the disengage slot 75 and away from the weight disengage mechanism 23. It should be understood that all of the despin weights 19 are simultaneously disengaged in this manner.

After the despin weights 19 have been disengaged from the weight disengagement mechanisms 23, a yo-yo action takes place, that is, the despin weights 19 and their associated despin cords 21 unwind around the spacecraft 13. As the despin weights 19 get further from the spacecraft, less spin is required to conserve the same amount of spin momentum; thus the spin velocity of the spacecraft 13 decreases. Eventually, the despin weights 19 and despin cords 21 are extended, perpendicularly away from the spacecraft 13 as shown by the dashed lines in FIG. 2. At this point, the sides of the shanks 42 and the hooknoses 40 of the despin hooks 35 line up with the straight sides 36 of the despin hook pins 37, allowing the despin hooks 35 to become disengaged from the despin hook pins 37. This disengagement allows the despin weights 19 and attached despin cords 21 to drift away from the spacecraft (this operation can be seen in detail in FIGS. 3 and 4). Once the despin hooks 35 are free of the hook pins 37, the appendage release triggers 41 are free to pass through the cylinder blocks 49. By passing through the cylinder blocks 49 the appendage release triggers 41 relieve the outward tension they have been exerting on the triggering loop 24.

In FIG. 3, the schematically represented triggering loop 24 has sharp corners, which indicate that the triggering loop 24 is pulled tightly around the pulleys 47 (see FIG. 2). In FIG. 4, the schematically represented triggering loop 24 has rounded corners, which indicates that there is less tension on it.

While the despin hooks 35 are engaged with the despin hook pins 37, the appendage release triggers 41 are held by the cylinder blocks 49, and, in turn, hold the triggering loop 24 taut. When the triggering loop 24 is taut, as shown in FIG. 3, it provides sufficient pull on each of the piston shafts 55 and the attached piston-cams 57 to overcome the biasing springs 59; thus the piston-cams 57 are pulled to the left as seen in FIG. 3. As explained above, when the piston-cams 57 are pulled to the left, the ball latches 63 are forced outwardly through the holes 61 and against the walls thereof in the cylindrical housings 53. The ball latches protrude slightly outward beyond the outer walls of the cylindrical housings 53 and engage the secondary booms 31 of the double foldable appendages 15. This engagement prevents the foldable appendages 15 from unfolding while the triggering loop 24 is held taut.

As soon as the appendage release triggers 41 are allowed to pass through the cylinder blocks 49, and relieve the outward tension they have been exerting on the triggering loop 24, the triggering loop 24, in turn, relaxes the pull it has been exerting on the piston shafts 55. At this point the force of the biasing springs 59 takes over and pushes the piston-cam 57 to the right. The ball latches 63, no longer being forced outwardly by the piston-cams 57, fall back into the cylindrical housings 53, and thereby disengage from the secondary booms 31. This disengagement allows the secondary booms 31 to move to the right over the ball latches 63 so that appendages 15 can unfold freely and arrive at their final position as represented by the dashed lines in FIG. 1.

To summarize generally the sequence of events: The despin weights 19 are disengaged from the side of the spacecraft 13 on command, and the despin cords 21 unwind automatically from the spacecraft 13 until the despin hooks 35 rotate sufficiently to automatically, simultaneously release the despin cords 21 and the despin weights 19 attached thereto, and thereby unlock the despin hook pins 37. Unlocking the despin hook pins 37 allows the appendage release triggers 41 to pass through the cylinder blocks 49, thus causing slack in the triggering loop 24, which, in turn, relaxes tension on the piston shafts 55. This relaxation of tension on piston shafts 55 allows the biasing springs 59 to push the piston-cams 57 outwardly. Outward motion of the piston-cams 57 allows the ball latches 63 to recede into the cylindrical housings 53, so that the folded appendages 15 can pass over the ball latches 63 and unfold, and thereby obtain their final positions as represented by the dashed lines in FIG. 1.

It can be understood by those skilled in the art that the inventive system coordinates the operation of a despin mechanism with the operation of a mechanism for unfolding a double foldable appendage. The system delays deployment of the folded appendage until after completion of the despin function. It does this in accordance with a sequence of controlled operational steps. Only one electrical signal must be fed in at an input and the chain of events follows mechanically.

While this invention has been particularly shown and described with reference to a preferred embodiment, it will be understood by those skilled in the art that various changes in form and detail may be made therein without departing from the spirit and scope of the invention. For example, various other weight disengage mechanisms could be used to release the despin weights 19 from the cylinder blocks 49 instead of the disengage mechanism shown in FIGS. 5 and 6. In addition, while weight disengagement supports 39 and cylinder-piston supports 51 are shown attached to spacecraft 13, they can all equally as well be housed within a spacecraft proper.

What is claimed is:

1. An appendage release system for releasing appendages from a spinning body, comprising:
   a despin means for reducing the spin rate of the spinning body;
   means for providing separation of said despin means from said body after said despin means has reduced said spin rate such that said despin means is entirely freed from any connection to said body;
   an appendage release means for releasing said appendages; and, linkage means connected between said despin means and said appendage release means for actuating said appendage release means in response to said separation of said despin means from the body.

2. An appendage release system as claimed in claim 1 wherein said despin means comprises:
a plurality of despin weights;
a weight release means for moving said despin weights outwardly away from said spinning body to reduce the spin rate of said spinning body and then releasing said despin weights from said spinning body; and,
said linkage means actuates said appendage release means in response to the release of said despin weights from said spinning body.

3. An appendage release system as claimed in claim 2 wherein said linkage means comprises a flexible loop.

4. An appendage release system as claimed in claim 3 wherein said linkage means further comprises a triggering means for holding said flexible loop taut until the release of said despin weights and for allowing said flexible loop to relax upon release of said despin weights.

5. An appendage release system as claimed in claim 4 wherein:
each of said appendages has a release means; and
each of said release means is attached to said flexible loop.

6. An appendage release system as claimed in claim 5 wherein said release means responds to a relaxation of said flexible loop to release said appendages.

7. An appendage release system as claimed in claim 6 wherein said release means comprises:
a cam attached to said flexible loop:
a stationary housing means for housing said cam and allowing said cam to have movement between a first position and a second position; and,
a latch means for cooperating with said cam so as to maintain the appendage in an association with said releasing means when said cam is in said first position and to release said appendage when said cam is moved into said second position.

8. An appendage release system as claimed in claim 7 further comprising a biasing means for cooperating with said cam to move it to said second position upon relaxation of said flexible loop.

9. An appendage release system as claimed in claim 8 wherein:
said stationary housing is in the general shape of a cylinder;
said cam is in the general shape of a piston; and,
said latch means comprises at least one ball.

10. An appendage release system as claimed in claim 9 wherein said spinning body is a spacecraft and said flexible loop encircles said spacecraft.

* * * * *